(12) United States Patent
Kitada et al.

(10) Patent No.: US 8,317,961 B2
(45) Date of Patent: Nov. 27, 2012

(54) SYSTEM AND METHOD FOR MANUFACTURING OPTICAL DISPLAY DEVICE, SET OF MATERIAL ROLLS AND METHOD FOR MANUFACTURE THEREOF

(75) Inventors: Kazuo Kitada, Ibaraki (JP); Tomokazu Yura, Ibaraki (JP); Satoru Koshio, Ibaraki (JP); Takuya Nakazono, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 0 days.

(21) Appl. No.: 13/000,242

(22) PCT Filed: May 12, 2010

(86) PCT No.: PCT/JP2010/058047
§ 371 (c)(1),
(2), (4) Date: Dec. 20, 2010

(87) PCT Pub. No.: WO2010/131677

PCT Pub. Date: Nov. 18, 2010

(65) Prior Publication Data

US 2011/0104423 A1    May 5, 2011

(30) Foreign Application Priority Data

May 15, 2009  (JP) .................. 2009-118960
May 12, 2010  (JP) .................. 2010-110044

(51) Int. Cl.
*B29C 65/48*    (2006.01)
*B32B 37/14*    (2006.01)
*B32B 38/04*    (2006.01)

(52) U.S. Cl. ........ 156/257; 156/268; 156/264; 156/378; 156/252; 156/253; 156/270; 445/24

(58) Field of Classification Search .................. 156/192, 156/259, 271, 264, 199, 378, 252, 253, 267, 156/270, 256, 64, 257, 268; 359/900; 445/24; 83/13; 242/525, 530
See application file for complete search history.

(56) References Cited

U.S. PATENT DOCUMENTS 4,397,410 A * 8/1983 Schueler .................. 225/98
(Continued)

FOREIGN PATENT DOCUMENTS

EP    2216674 A1    8/2010
(Continued)

OTHER PUBLICATIONS

International Search Report of PCT/JP2010/058047, mailing date Jun. 29, 2010.
(Continued)

*Primary Examiner* — Linda L Gray
(74) *Attorney, Agent, or Firm* — Westerman, Hattori, Daniels & Adrian, LLP

(57) ABSTRACT

A system for manufacturing an optical display device includes providing a roll of a belt-shaped sheet material including an optical film and a release film, which has score lines previously formed by cutting layers of the material other than the release film. The optical film is bonded to a rectangular optical display unit of the display device. In the bonding steps, a first optical film is divided by the score lines into pieces each having a length corresponding to a long side of the display unit, and a second optical film is divided by the score lines into pieces each having a length corresponding to a short side of the display unit. The first optical film has a first polarizing plate whose longitudinal direction is parallel to its absorption axis, and the second optical film has a second polarizing plate whose longitudinal direction is parallel to its absorption axis.

5 Claims, 7 Drawing Sheets

U.S. PATENT DOCUMENTS

| | | |
|---|---|---|
| 6,848,488 B2 * | 2/2005 | Choo et al. .................. 156/521 |
| 2003/0217806 A1 | 11/2003 | Tait et al. |
| 2005/0016670 A1 | 1/2005 | Kanbara et al. |
| 2006/0124248 A1 | 6/2006 | Kanbara et al. |
| 2007/0200976 A1 * | 8/2007 | Kawamoto et al. ............ 349/96 |
| 2008/0278673 A1 * | 11/2008 | Yoshioka et al. ............ 349/194 |
| 2008/0303639 A1 * | 12/2008 | Ford et al. ................ 340/10.51 |
| 2008/0307686 A1 * | 12/2008 | Wade et al. .................... 40/638 |
| 2009/0159175 A1 | 6/2009 | Nakahira et al. |
| 2009/0199950 A1 | 8/2009 | Kitada et al. |
| 2009/0218049 A1 | 9/2009 | Kanbara et al. |
| 2010/0186890 A1 | 7/2010 | Kitada et al. |
| 2010/0282406 A1 | 11/2010 | Kitada et al. |
| 2010/0288441 A1 | 11/2010 | Kitada et al. |

FOREIGN PATENT DOCUMENTS

| | | |
|---|---|---|
| JP | 11-231129 A | 8/1999 |
| JP | 2004-250213 A | 9/2004 |
| JP | 2005-037417 A | 2/2005 |
| JP | 2005-043384 A | 2/2005 |
| JP | 2007-140046 A | 6/2007 |
| JP | 2008-275926 A | 11/2008 |
| TW | 200844029 B | 11/2008 |

OTHER PUBLICATIONS

Supplementary European Search Report dated May 19, 2011, issued in corresponding European Patent Application No. 10774934.3.
Taiwanese Office Action dated Jun. 10, 2011, issued in corresponding Taiwanese Patent Application No. 099115532.
International Preliminary Report on Patentability (Form PCT/IB/373) of International Application No. PCT/JP2010/058047 mailed Dec. 12, 2011 with Forms PCT/ISA/237 and PCT/IB/338.
Taiwanese Office Action dated Oct. 28, 2011, issued in corresponding Taiwanese Patent Application No. 099115532.
European Search Report dated Mar. 27, 2012, issued in corresponding European Patent Application No. 11188039.9.
European Office Action mailed on Aug. 7, 2012, issued in corresponding European Patent Application 10774934.3.

\* cited by examiner

SYSTEM AND METHOD FOR MANUFACTURING OPTICAL DISPLAY DEVICE, SET OF MATERIAL ROLLS AND METHOD FOR MANUFACTURE THEREOF

TECHNICAL FIELD

The invention relates to a system and a method for manufacturing an optical display device, which is for use in bonding optically-anisotropic optical films, such as polarizing plate-containing optical films, to one and the other surfaces of a rectangular optical display unit, and to a set of material rolls and a method for the manufacture thereof.

BACKGROUND ART

FIG. 8 schematically shows a conventional method for manufacturing an optical display unit to be incorporated into a liquid crystal display device. First, an optical film manufacturer produces a belt-shaped sheet material, which includes an optical film, in the form of a roll (#1). Specific processes for the manufacture thereof are known, and therefore a description thereof is omitted. The roll of the belt-shaped sheet material typically includes a raw polarizing plate, a raw retardation plate, or a raw laminated film of a polarizing plate and a retardation plate for use in the production of liquid crystal displays. The long material is then stamped into pieces of the sheet material having a shape according to the size of an optical display unit to which each piece will be bonded (#2). Each piece of the sheet material (optical film) obtained by the stamping is then subjected to an appearance inspection (#3). Examples of the inspection method include a visual inspection for defects and an inspection using a known defect inspection apparatus. The term "defect" typically means fouling of the surface or the inside, scratches, a foreign substance-containing defect with a special shape such as a dented and twisted shape (also called "knick"), bubbles, foreign substances, etc. The finished product is then inspected (#4). The finished product inspection is performed according to more strict quality criteria than those for the appearance inspection to determine whether the product is non-defective. Subsequently, the four end faces of each piece of the sheet material are worked (#5). The working is performed to prevent the pressure-sensitive adhesive or any other material from coming out of the end faces in transit. Each piece of the sheet material is then subjected to clean packaging in a clean room environment (#6). Subsequently, packaging for transportation (transport packaging) is performed (#7). Each piece of the sheet material manufactured as described above is transported to a panel processing manufacturer.

The panel processing manufacturer unpacks the piece of the material sheet transported (#11). An appearance inspection is then performed to check whether scratches, stains or other defects are produced in transit or during unpacking (#12). The piece of the sheet material determined to be non-defective by the inspection is then transferred to the next step. This appearance inspection may be omitted in some cases. The optical display unit (such as a glass substrate unit with a sealed liquid crystal cell) to which the piece of the sheet material will be bonded is previously manufactured and cleaned before the bonding step (#13).

The piece of the sheet material and the optical display unit are bonded together (#14). The release film is peeled off from the piece of the sheet material so that the pressure-sensitive adhesive can be left, and the bonding surface of the pressure-sensitive adhesive layer is attached to one side of the optical display unit. The other side of the optical display unit may also be subjected to a similar bonding process. The optical films to be bonded to both sides of the optical display unit may have the same structure or different structures. The optical display device having the bonded optical film is then subjected to an inspection and a defect inspection (#15). The optical display device determined to be non-defective by the inspection is transferred to an implementing process (#16). On the other hand, the optical display device determined to be defective is subjected to a reworking process (#17). In the reworking process, the optical film is peeled off from the optical display unit. A new optical film is bonded to the optical display unit having undergone the reworking process (#14).

The manufacturing process described above particularly requires the steps of working the end faces, packaging each piece of the sheet material, and unpacking the material, because the optical film manufacturer and the panel processing manufacturer are located at different places. However, such a multi-step process has the problem of an increase in manufacturing cost. There are also problems in which scratches, dust, stains, and the like can be caused by the multi-step process or the transportation so that an inspection process can be necessary, and problems in which different types of sheet materials must be carried and managed.

Japanese Patent Application Laid-Open (JP-A) No. 2007-140046 (Patent Document 1) discloses a method to solve the problems. A system by the method includes means for drawing and feeding a belt-shaped sheet material from a roll of the belt-shaped sheet material including an optical film to be used as a component of an optical display device, means for detecting defects in the belt-shaped sheet material drawn from the feeding means, means for cutting the belt-shaped sheet material into sheet material pieces based on the result of the detection by the detecting means, means for transporting each sheet material piece cut by the cutting means to a bonding process, and means for bonding the transported sheet material piece to an optical display unit as a component of the optical display device, wherein the respective means are arranged on a continuous production line. In this system, the belt-shaped sheet material including the optical film can be directly cut into the desired size, and the cut piece of the sheet material can be directly bonded to the optical display unit. According to a conventional technique, the belt-shaped sheet material is stamped into pieces, and the stamped sheet material pieces are each carefully packaged and delivered to a panel processing manufacturer. According to this system, however, a roll of the belt-shaped sheet material can be directly packaged and delivered.

PRIOR ART LITERATURE

Patent Document

Patent Document 1: Japanese Patent Application Laid-Open (JP-A) No. 2007-140046

SUMMARY OF THE INVENTION

Problems to be Solved by the Invention

However, the optical display device manufacturing system disclosed in Patent Document 1 does not include any additional apparatus for bonding another optical film to the other side of the optical display unit after the bonding of an optical film to one side of the optical display unit. Therefore, if the same manufacturing system is used to bond another optical film to the other side, loading the optical display unit on the system after the bonding results in double work, and there is a room for improvement.

When bonded to one and the other surfaces of an optical display unit, polarizing plates have different absorption axis directions (crossing each other at right angles) on the one and the other surfaces. In addition, it is generally difficult to produce a material roll having an absorption axis in the width direction of the roll, whereas the optical display unit generally has a rectangular shape. Considering these things, a satisfactory system configuration cannot be obtained by simply adding each of means for performing the process from the feeding of the belt-shaped sheet material to the bonding thereof to the manufacturing system disclosed in Patent Document 1.

Not only when polarizing plates are placed on one and the other surfaces, but also, for example, when retardation plates are placed on one and the other surfaces of the optical display unit, their slow axis directions on the one and the other surfaces have to be perpendicular to each other in some cases. Also in such cases, there is the same problem as in the case where polarizing plates are laminated.

It is therefore an object of the invention to provide a system and a method for manufacturing an optical display device, in which optical films can be bonded to one and the other surfaces of an optical display unit in such a manner that the optical anisotropy of the one is orthogonal to that of the other by using two material rolls that are the same in the direction of optical anisotropy, such as the direction of absorption axis, and to provide a set of material rolls and a method for manufacture thereof.

Means for Solving the Problem

The above object can be achieved by the present inventions as follows. That is, a system for manufacturing an optical display device of the present invention is a system for manufacturing an optical display device comprising a rectangular optical display unit and an optically-anisotropic optical film bonded to the optical display unit, and comprises:

a first bonding apparatus for bonding a divided piece of a first optical film to one surface of an optical display unit, wherein the divided piece of the first optical film has a length corresponding to a long side of the optical display unit and is obtained from a roll of a belt-shaped sheet material that comprises the first optical film and has score lines that are previously formed so that the first optical film can be divided by the score lines into pieces each having a length corresponding to the long side of the optical display unit, wherein the first optical film has a width corresponding to a short side of the optical display unit; and a second bonding apparatus for bonding a divided piece of a second optical film to another surface of the optical display unit, wherein the divided piece of the second optical film has a length corresponding to the short side of the optical display unit and is obtained from a roll of a belt-shaped sheet material that comprises the second optical film and has score lines that are previously formed so that the second optical film can be divided by the score lines into pieces each having a length corresponding to the short side of the optical display unit, wherein the second optical film has a width corresponding to the long side of the optical display unit.

In the optical display device manufacturing system of the invention, divided pieces of optical films with sizes corresponding to the short and long sides of the optical display unit can be obtained, respectively, only by dividing, by each score line, the optical film fed from each of a material roll with a width corresponding to the short side of the optical display unit and a material roll with a width corresponding to the long side of the optical display unit. The former and the latter are each divided by each score line into a piece with a length corresponding to the long side and a piece with a length corresponding to the short side, and the pieces are bonded to both surfaces of the optical display unit. Therefore, when two material rolls that are the same in the direction of optical anisotropy, such as the direction of absorption axis are used, optical films can be bonded to one and the other surfaces of the optical display unit in such a manner that the optical anisotropy of one of the optical films is orthogonal to that of the other optical film.

Also, a system for manufacturing an optical display device of the present invention is a system for manufacturing an optical display device comprising a rectangular optical display unit and an optical film including a polarizing plate and bonded to the optical display unit, and comprises:

an optical display unit feeding apparatus for feeding the optical display unit;

a first optical film feeding apparatus for drawing and feeding a belt-shaped sheet material from a roll of the belt-shaped sheet material, wherein the belt-shaped sheet material comprises a first optical film with a width corresponding to a short side of the optical display unit and has score lines that are previously formed so that the first optical film can be divided by the score lines into pieces each having a length corresponding to a long side of the optical display unit;

a first bonding apparatus for bonding a divided piece of the first optical film to one surface of the optical display unit, wherein the optical display unit is fed from the optical display unit feeding apparatus, and the first optical film is fed from the first optical film feeding apparatus;

a feeder for transporting and feeding the optical display unit after the bonding of the first optical film;

a second optical film feeding apparatus for drawing and feeding a belt-shaped sheet material from a roll of the belt-shaped sheet material, wherein the belt-shaped sheet material comprises a second optical film with a width corresponding to the long side of the optical display unit and has score lines that are previously formed so that the second optical film can be divided by the score lines into pieces each having a length corresponding to the short side of the optical display unit; and a second bonding apparatus for bonding a divided piece of the second optical film to another surface of the optical display unit, wherein the optical display unit is fed from the feeder, and the second optical film is fed from the second optical film feeding apparatus.

The optical display device manufacturing system of the invention further includes the feeder, the second optical film feeding apparatus, and the second bonding apparatus as stated above and is also configured so that the first and second optical film feeding apparatuses can feed divided pieces of optical films with different widths and lengths corresponding to the long and short sides of the optical display unit, respectively. Thus, using material rolls including polarizing plates with the same absorption axis direction, optical films can be bonded to one and the other surfaces of the optical display unit in a continuous manufacturing line.

In the above system, it is preferred that the feeder has a turning mechanism for turning the optical display unit to a bonding direction for the second bonding apparatus after the bonding in the first bonding apparatus. The presence of such a turning mechanism makes it unnecessary to vertically arrange a set of the first optical film feeding apparatus and the first bonding apparatus and a set of the second optical film feeding apparatus and the second bonding apparatus, which makes it possible to save the space of the manufacturing system. The turning mechanism also makes it possible to set a proper bonding angle for the second bonding apparatus. Specifically, higher turning position accuracy can be obtained when the optical display unit, which is harder than the optical film, is turned than when the flexible material such as the optical film is turned.

Also, it is preferred that the first and second optical film feeding apparatuses each has a defective portion removing mechanism for removing a defective divided piece of the optical film. The presence of such a removing mechanism makes it possible to remove defective portions from the optical film and to improve the optical film yield.

Further, it is preferred that the first and second optical film feeding apparatuses have feeding mechanisms for feeding the first and second optical films to the first and second bonding apparatuses, respectively, by using, as a carrying medium, a release film which is provided on the optical film with a pressure-sensitive adhesive layer interposed therebetween. When such a feeding mechanism is provided, the first and second optical films can be fed with high accuracy to the first and second bonding apparatuses, respectively, using a simple feeding mechanism.

On the other hand, a method for manufacturing an optical display device of the present invention is a method for manufacturing an optical display device comprising a rectangular optical display unit and an optically-anisotropic optical film bonded to the optical display unit, and comprises:

a first bonding step comprising: providing a roll of a belt-shaped sheet material that comprises a first optical film with a width corresponding to a short side of the optical display unit and has score lines that are previously formed so that the first optical film can be divided by the score lines into pieces each having a length corresponding to a long side of the optical display unit; and bonding a divided piece of the first optical film having a length corresponding to the long side of the optical display unit to one surface of the optical display unit; and a second bonding step comprising: providing a roll of a belt-shaped sheet material that comprises a second optical film with a width corresponding to the long side of the optical display unit and has score lines that are previously formed so that the second optical film can be divided by the score lines into pieces each having a length corresponding to the short side of the optical display unit; and bonding a divided piece of the second optical film having a length corresponding to the short side of the optical display unit to another surface of the optical display unit.

In the optical display device manufacturing method of the invention, a material roll with a width corresponding to the short side of the optical display unit and a material roll with a width corresponding to the long side of the optical display unit are used, and the former and the latter are each divided by each score line into a piece with a length corresponding to the long side and a piece with a length corresponding to the short side, and the pieces are bonded to both surfaces of the optical display unit. Therefore, when two material rolls that are the same in the direction of optical anisotropy, such as the direction of absorption axis are used, optical films can be bonded to one and the other surfaces of the optical display unit in such a manner that the optical anisotropy of one of the optical films is orthogonal to that of the other optical film.

In the above method, it is preferred that the method further comprises a turning step comprising turning the optical display unit to a bonding direction for the second bonding step after the first bonding step. Such a turning step makes it unnecessary to vertically arrange the first and second optical film feed directions, which makes it possible to save the space of the manufacturing system. The use of the turning step also makes it possible to set a proper bonding angle for the second bonding apparatus.

Also, it is preferred that the method further comprises a defective portion removing step comprising removing a defective divided piece of the optical film when the first and second optical films are each fed. Such a removing step makes it possible to remove defective portions from the optical film and to improve the optical film yield.

Further, it is preferred that the first and second optical films are transported and fed to the first and second bonding steps, respectively, using, as a carrying medium, a release film which is provided on the optical film with a pressure-sensitive adhesive layer interposed therebetween. When such a feeding method is used, the first and second optical films can be fed with high accuracy to the first and second bonding steps, respectively, using a simple feeding mechanism.

A set of material rolls of the invention comprises:

a first roll comprising a first optical film to be bonded to one surface of a rectangular optical display unit, the first roll comprising a first belt-shaped sheet material that comprises the first optical film, a first pressure-sensitive adhesive layer, and a first release film laminated in this order, wherein the first optical film comprises a first polarizing plate whose longitudinal direction is parallel to its absorption axis, the first belt-shaped sheet material having score lines that are previously formed so that the first optical film can be divided by the score lines into pieces each having a length corresponding to a long side of the optical display unit, the first belt-shaped sheet material having undergone a slitting process in a direction parallel to the longitudinal direction of the first polarizing plate so that it has a width corresponding to a short side of the optical display unit, and having been wound into the roll; and a second roll comprising a second optical film to be bonded to another surface of the optical display unit, the second roll comprising a second belt-shaped sheet material that comprises the second optical film, a second pressure-sensitive adhesive layer, and a second release film laminated in this order, wherein the second optical film comprises a second polarizing plate whose longitudinal direction is parallel to its absorption axis, the second belt-shaped sheet material having score lines that are previously formed so that the second optical film can be divided by the score lines into pieces each having a length corresponding to a short side of the optical display unit, the second belt-shaped sheet material having undergone a slitting process in a direction parallel to the longitudinal direction of the second polarizing plate so that it has a width corresponding to the long side of the optical display unit, and having been wound into the roll.

The set of material rolls according to the invention includes a first roll having undergone slitting into a width corresponding to the short side of the optical display unit; and a second roll having undergone slitting into a width corresponding to the long side of the optical display unit. Therefore, when the set is used, divided pieces of optical films with sizes corresponding to the short and long sides of the optical display unit can each be obtained only by dividing, by each score line, the optical film fed from each of the rolls. In this case, since both roll materials have an absorption axis in the longitudinal direction, the bonding can be performed with good axis accuracy, so that the optical display device can have good optical properties after the bonding. In addition, the respective optical films have absorption axes, one of which can be parallel to the long side of the optical display unit, and the other of which can be parallel to the short side. Therefore, the absorption axes of the optical films can be made perpendicular to each other only by bonding them to one and the other surfaces of the optical display unit, respectively. Thus, there is provided a set of material rolls with which optical films can be bonded with their absorption axes perpendicular to each other to the optical display unit only through the process of dividing, by each score line, the optical film fed from each of the two material rolls, which can provide high axis accuracy for the bonding.

It is preferred that the optical display unit to be subjected to the bonding is a VA or IPS mode liquid crystal panel. Particularly when the optical display unit is formed using a VA or IPS mode liquid crystal panel, which has been recently used in large screen TVs, etc., the polarizing plates of the first and second optical films can be positioned so that their absorption axes are perpendicular to each other and parallel to the side of the rectangular liquid crystal panel. In this case, therefore, the optical film can be simply divided by each score line, while each of the first and second material rolls having undergone slitting parallel to the absorption axis is unwound, so that a high production rate is possible.

A manufacturing method for a material roll of the invention is a manufacturing method for a material roll used in the set of material rolls, and comprises the steps of:

slitting a material having undergone no slitting process to form a belt-shaped sheet material with a width corresponding to the long or short side of the optical display unit, wherein the material comprises an optical film, a pressure-sensitive adhesive layer, and a release film laminated in this order, the optical film comprises a polarizing plate whose longitudinal direction is parallel to its absorption axis, and the slitting is performed parallel to the longitudinal direction of the polarizing plate; and winding the resulting belt-shaped sheet material into a roll.

According to the material roll manufacturing method of the invention, slitting into a width corresponding to the short or long side of the optical display unit is performed, so that an optical film with a size corresponding to the short or long side of the optical display unit can be obtained only by dividing the material by each score line. In addition, since the unslit material used has a longitudinal direction parallel to the absorption axis of the polarizing plate, the bonding can be performed with good axis accuracy in the manufacturing process, so that the optical display device can have good optical properties after the bonding.

A material roll of the invention comprises an optical film to be bonded to a surface of a rectangular optical display unit, comprising:

a belt-shaped sheet material that comprises the optical film, a pressure-sensitive adhesive layer, and a release film laminated in this order, wherein the optical film comprises a polarizing plate whose longitudinal direction is parallel to its absorption axis, the belt-shaped sheet material having score lines that are previously formed so that the optical film can be divided by the score lines into pieces each having a length corresponding to a long or short side of the optical display unit, the belt-shaped sheet material having undergone a slitting process in a direction parallel to the longitudinal direction of the polarizing plate so that it has a width corresponding to the short or long side of the optical display unit, and having been wound into the roll.

The material roll of the invention is a roll of a material having undergone slitting into a width corresponding to the short or long side of the optical display unit. Therefore, an optical film with a size corresponding to the short or long side of the optical display unit can be obtained only by dividing the material by each score line. In addition, since slitting has been performed in the longitudinal direction parallel to the absorption axis of the polarizing plate, the bonding can be performed with good axis accuracy in the manufacturing process, so that the optical display device can have good optical properties after the bonding.

A method for manufacturing a material roll of the invention is a method for manufacturing a material roll comprising an optical film to be bonded to a surface of a rectangular optical display unit, and comprises the steps of:

slitting a material having undergone no slitting process to form a belt-shaped sheet material with a width corresponding to a short or long side of the optical display unit, wherein the material comprises the optical film, a pressure-sensitive adhesive layer, and a release film laminated in this order and has score lines that are previously formed so that the optical film can be divided by the score lines into pieces each having a length corresponding to the long or short side of the optical display unit, the optical film comprises a polarizing plate whose longitudinal direction is parallel to its absorption axis, and the slitting is performed parallel to the longitudinal direction of the polarizing plate; and winding the resulting belt-shaped sheet material into a roll.

According to the material roll manufacturing method of the invention, slitting into a width corresponding to the short or long side of the optical display unit is performed, so that an optical film with a size corresponding to the short or long side of the optical display unit can be obtained only by dividing the material by each score line. In addition, since the unslit material used has a longitudinal direction parallel to the absorption axis of the polarizing plate, the bonding can be performed with good axis accuracy in the manufacturing process, so that the optical display device can have good optical properties after the bonding.

A method for manufacturing an optical display device of the invention is a method for manufacturing an optical display device comprising an optical film including a polarizing plate and a rectangular optical display unit having a surface to which the optical film is bonded, and comprises the steps of:

providing a material roll that is a roll of a belt-shaped sheet material obtained by slitting a material having undergone no slitting process into a width corresponding to a short or long side of the optical display unit, wherein the material comprises the optical film, a pressure-sensitive adhesive layer, and a release film laminated in this order and has score lines that are previously formed so that the optical film can be divided by the score lines into pieces each having a length corresponding to the long or short side of the optical display unit, the optical film comprises a polarizing plate whose longitudinal direction is parallel to its absorption axis, and the slitting is performed parallel to the longitudinal direction of the material;

drawing the belt-shaped sheet material from the material roll; and bonding a divided piece of the optical film to a surface of the rectangular optical display unit.

According to the optical display device manufacturing method of the invention, the material roll used has undergone slitting into a width corresponding to the short or long side of the optical display unit, and therefore, an optical film with a size corresponding to the short or long side of the optical display unit can be obtained only by dividing the material by each score line. In addition, since the unslit material used has a longitudinal direction parallel to the absorption axis of the polarizing plate, the bonding can be performed with good axis accuracy in the manufacturing process, so that the optical display device can have good optical properties after the bonding.

A system for manufacturing an optical display device of the invention is a system for manufacturing an optical display device comprising an optical film including a polarizing plate and a rectangular optical display unit having a surface to which the optical film is bonded, and comprises:

a bonding apparatus for drawing a belt-shaped sheet material from a roll of the belt-shaped sheet material and bonding a divided piece of the optical film to the rectangular optical display unit, wherein the belt-shaped sheet material is obtained by slitting a material having undergone no slitting process into a width corresponding to a short or long side of the optical display unit, wherein the material comprises the optical film, a pressure-sensitive adhesive layer, and a release film laminated in this order and has score lines that are previously formed so that the optical film can be divided by the score lines into pieces each having a length corresponding to the long or short side of the optical display unit, the optical film comprises a polarizing plate whose longitudinal direction is parallel to its absorption axis, and the slitting is performed parallel to the longitudinal direction of the material.

According to the optical display device manufacturing system of the invention, the material roll used has undergone slitting into a width corresponding to the short or long side of the optical display unit, and therefore, an optical film with a size corresponding to the short or long side of the optical display unit can be obtained only by dividing the material by each score line. In addition, since the unslit material used has a longitudinal direction parallel to the absorption axis of the polarizing plate, the bonding can be performed with good axis accuracy in the manufacturing process, so that the optical display device can have good optical properties after the bonding.

EMBODIMENTS FOR CARRYING OUT THE INVENTION

Figure 1:
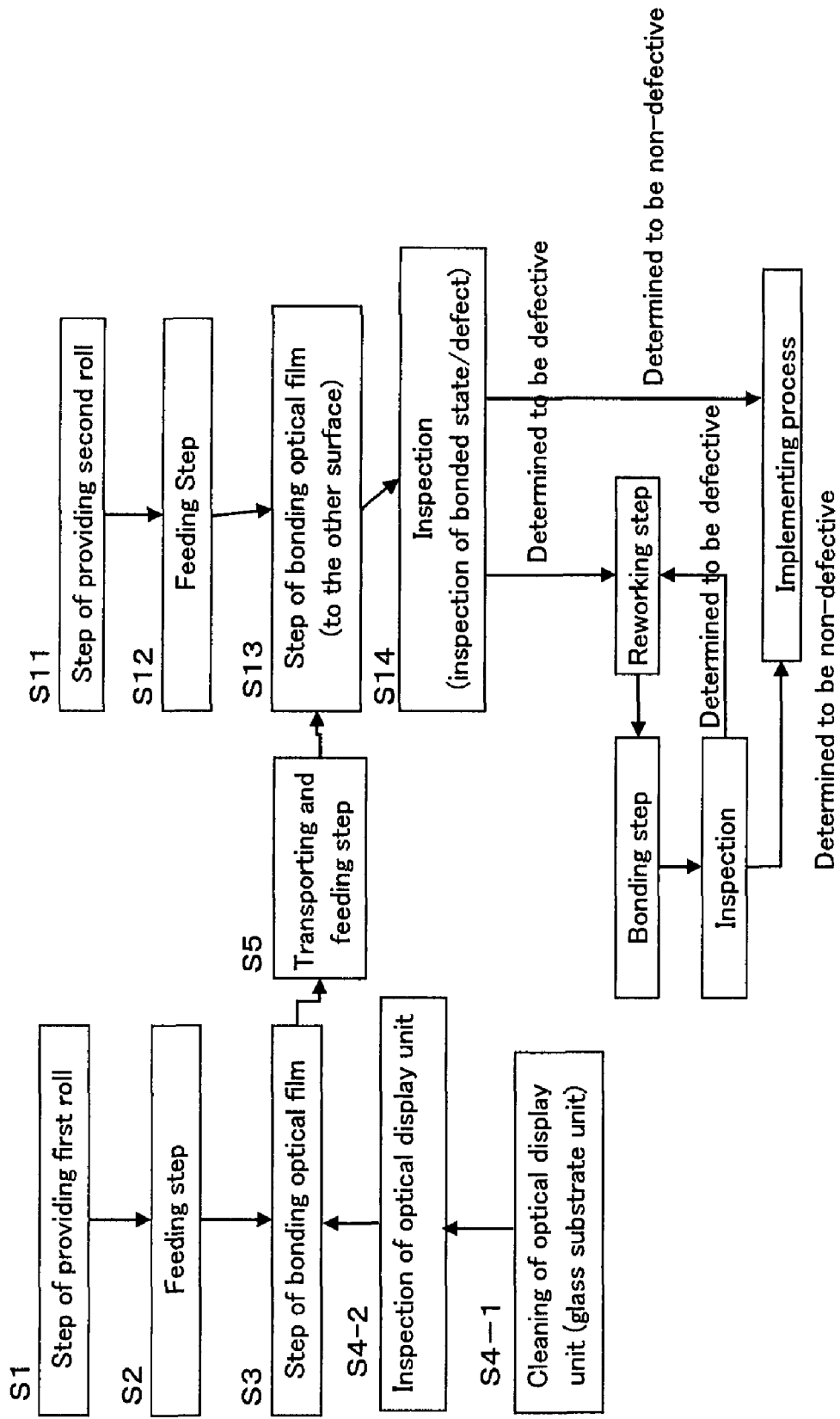
FIG. 1 is a flow chart showing a process performed using the manufacturing system of the invention.
Figure 2:
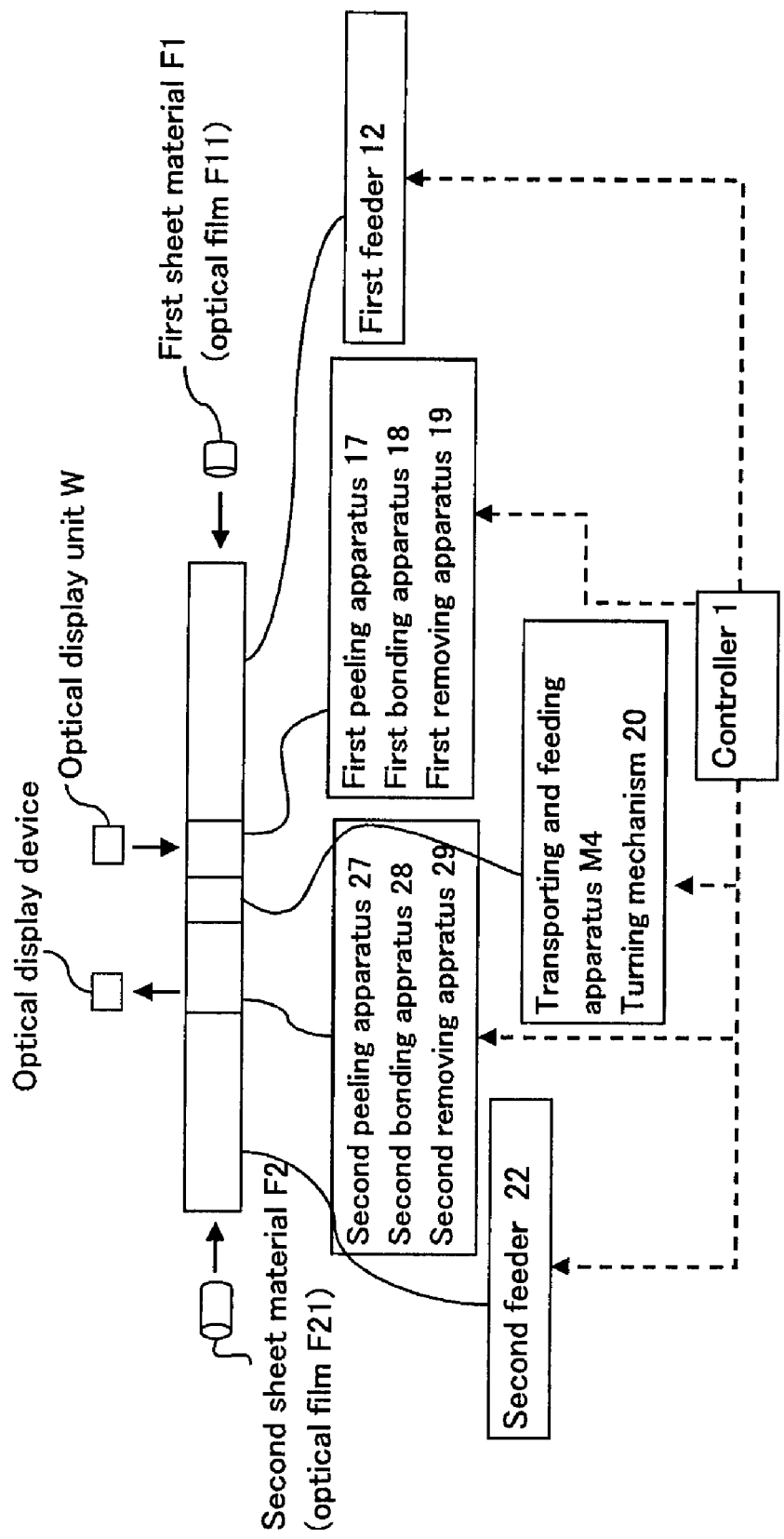
FIG. 2 is a diagram for illustrating an example of the manufacturing system of the invention.
Figure 3:
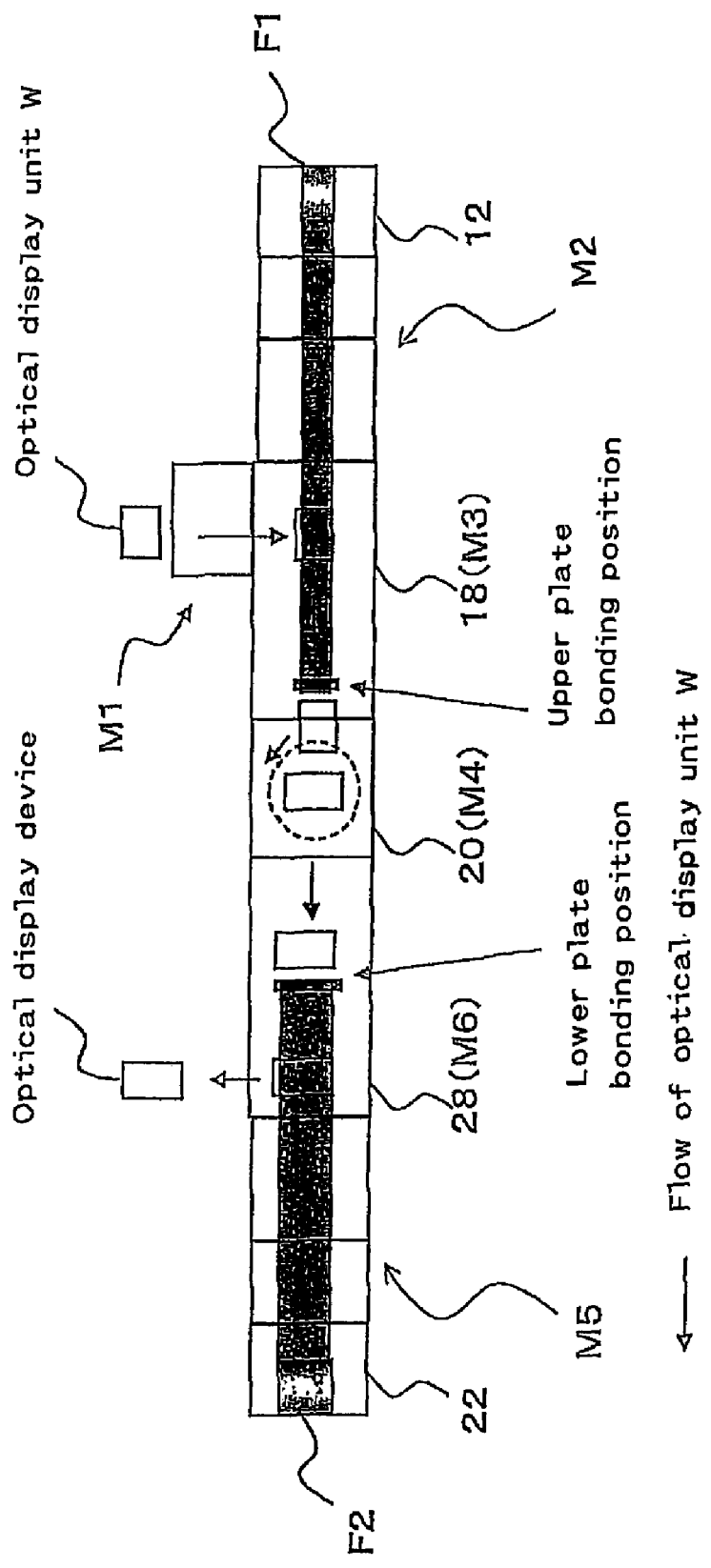
FIG. 3 is a diagram for illustrating an example of the manufacturing system of the invention.

Embodiments of the invention are described below in the order of materials used in the optical display device manufacturing system, manufacturing process flow, and the structure of each component of the manufacturing system. FIG. 1 shows an example of the flow chart of the optical display device manufacturing method. FIG. 2 is a schematic diagram showing an example of the optical display device manufacturing system. FIG. 3 is a layout plan view showing an example of the optical display device manufacturing system.

Optical Display Unit

The optical display unit for use in the invention is intended to include any assembly of parts for displaying characters or images. The optical display unit is typically a liquid crystal cell, an organic electroluminescence panel, or the like. The invention is effective when using an optical display unit having a rectangular outline shape, such as that with a long side/short side ratio of 16/9 or 4/3. The optical display unit may also have such a member as an optical film that is previously integrated as part of the laminated structure.

Optical Film

The optical film to be bonded to the optical display unit may be a monolayer film or a multilayer film. The optical film has at least one optically anisotropic layer. The term "optically anisotropic" or "optical anisotropy" means that the in-plane optical properties are not uniform, and examples of optical anisotropy include absorption anisotropy, refractive index anisotropy, and reflection anisotropy. The optical film is typically a polarizing plate having an absorption axis, a retardation film having a slow axis, a brightness enhancement film having a transmission axis, or a laminate thereof.

The polarizing plate-containing optical film may be a polarizing plate or an optical film including a laminate of a polarizing plate and a retardation film, a brightness enhancement film, or a combination of two or more of these films.

The belt-shaped sheet material for use in the invention is intended to include a long sheet that is processed to have a width corresponding to the short or long side of the optical display unit and is sufficiently longer in the longitudinal direction than in the width direction. For example, the length of the belt-shaped sheet material is 10 times or more the width. The belt-shaped sheet material may be any material containing the optical film. The belt-shaped sheet material preferably includes a polarizing plate-containing optical film, a pressure-sensitive adhesive layer, and a release film, which are provided in this order.

The material roll for use in the invention is a wound roll of the belt-shaped sheet material. The material roll is usually obtained by winding the belt-shaped sheet material around a roll core from one end thereof.

A protective transparent film is sometimes placed on the surface of any of these optical films. For example, a pressure-sensitive adhesive layer is preferably formed on one surface of the optical film so that the optical film can be bonded to the optical display unit, and a release film should be provided to protect the pressure-sensitive adhesive layer. A surface protecting film may be provided on the other surface of the optical film, for example, with a pressure-sensitive adhesive layer interposed therebetween.

The invention is effective when using two material rolls having optical anisotropy in the same direction, particularly using two material rolls in which the absorption axes of polarizing plates in optical films are in the same direction. The direction of the absorption axis of the polarizing plate is generally in the longitudinal direction of the material roll. When a retardation film is used, the slow axis of the retardation film may be parallel or perpendicular to the longitudinal direction of the material roll or oblique to the longitudinal direction of the material roll by a certain angle.

Manufacturing Flow Chart

The optical display device manufacturing method of the invention is a method for manufacturing an optical display device including an optical display unit and an optically anisotropic optical film bonded to the optical display unit, preferably a method for manufacturing an optical display device including an optical display unit and a polarizing plate-containing optical film bonded to the optical display unit.

The manufacturing method of the invention includes a first bonding step and a second bonding step. The manufacturing method preferably further includes a transporting and feeding step between the first and second bonding steps. The first and second bonding steps may be performed in any order or at the same time.

The first bonding step includes: providing a roll of a belt-shaped sheet material that includes a first optical film with a width corresponding to the short side of the optical display unit and has score lines that are previously formed so that the first optical film can be divided by the score lines into pieces each having a length corresponding to the long side of the optical display unit; and bonding a divided piece of the first optical film having a length corresponding to the long side of the optical display unit to one surface of the optical display unit.

The second bonding step includes: providing a roll of a belt-shaped sheet material that includes a second optical film with a width corresponding to the long side of the optical display unit and has score lines that are previously formed so that the second optical film can be divided by the score lines into pieces each having a length corresponding to the short side of the optical display unit; and bonding a divided piece of the second optical film having a length corresponding to the short side of the optical display unit to the other surface of the optical display unit.

More specifically, for example, the optical display device manufacturing method of the invention includes: a first bonding step including bonding a divided piece of the first optical film to one surface of the optical display unit, while drawing and feeding a belt-shaped sheet material from a roll of the belt-shaped sheet material including the first optical film; and a second bonding step including bonding a divided piece of the second optical film to the other surface of the optical display unit, while drawing and feeding a belt-shaped sheet material from a roll of the belt-shaped sheet material including the second optical film.

For example, the first bonding step may be performed by the process from (2) Feeding Step to (3) First Optical Film Bonding Step described below. For example, the second bonding step may be performed by the process from (6) Feeding Step to (7) Second Optical Film Bonding Step described below.

(1) Step of Providing First Material Roll (S1 in FIG. 1). A first roll of a first belt-shaped sheet material is provided. The width of the first roll depends on the size of the optical display unit to be bonded. More specifically, the width of the first roll is determined to correspond to one of the long and short sides of the optical display unit, and the width of the second roll is determined to correspond to the other. Therefore, the first and second rolls have different widths, and material rolls having undergone no slitting process (unslit materials rolls) are each previously subjected to a slitting process so as to have a predetermined width, and the materials with the predetermined widths are used.

The slitting process is performed while the material having undergone no slitting process (unslit material) is unwound from the roll. The slitting process may be performed by a method using a laser cutter or an edge tool such as a rotary circular knife. The process of producing the material roll preferably includes slitting the unslit material in the longitudinal direction and winding the resulting belt-shaped sheet material into a roll. A conceivable method for producing a material roll with a width corresponding to the long or short side of the optical display unit can include cutting the unslit material roll itself from one or both ends thereof. In such a method, however, the unslit material roll can be cut in such a condition that winding displacement occurs (such a condition that the roll does not have a flat end face), so that the axis direction of the optical film can be non-uniform in the produced material roll. In contrast, when the slitting step is followed by the winding step as described above, the axis of the optical film in the produced material roll has a uniform direction, so that the optical film can be bonded to the optical display unit with high axis precision. The object to be slit does not have to be in the form of a roll such as a roll of an unslit material and may be an unwound long material (such as a long material before wound up after produced). When the optical film contains a polarizing plate, the absorption axis preferably extends in the longitudinal direction of the long material. In such a case, the long material is preferably slit parallel to the absorption axis, and then the resulting belt-shaped sheet material is preferably wound into a roll.

As used herein, the expression "to correspond to the long or short side of the optical display unit" means that the bonding length of the optical film (exclusive of the length of the exposed portion) will correspond to the length of the long or short side of the optical display unit and does not mean that the width of the optical film has to be equal to the length of the long or short side of the optical display unit.

In an embodiment of the invention, each of the first and second rolls comprises a roll of a belt-shaped sheet material, which is obtained by slitting a polarizing plate (a component of the roll) parallel to the absorption axis thereof, and has an absorption axis in the longitudinal direction of the belt-shaped sheet material. This configuration provides high axis precision for the bonding, so that after the bonding, the optical display device has good optical properties. Particularly when the optical display unit is formed using a VA or IPS mode liquid crystal panel, which has been recently used in large screen TVs, etc., the polarizing plates of the first and second optical films can be positioned so that their absorption axes are perpendicular to each other. In this case, therefore, divided pieces of the first and second optical films can be each simply bonded to the surface of the optical display unit, while the belt-shaped sheet material obtained by slitting the long material parallel to its absorption axis is fed from each of the first and second rolls, so that a high production rate is possible.

For example, the influence of the axis precision during the bonding on the optical properties may be evaluated using the transmitted light intensity and contrast ratio (CR) described below. Specifically, a belt-shaped sheet material obtained by slitting a polarizing plate (CAT1463DU manufactured by NITTO DENKO CORPORATION)—containing long material parallel to the absorption axis of the polarizing plate and another belt-shaped sheet material obtained by slitting a polarizing plate-containing long material at a varied certain angle with respect to the absorption axis of the polarizing plate were each cut into a square sample piece (50 mm×50 mm) having a side parallel to the slitting direction. The two sample pieces were laminated, and the transmittance of the resulting laminate was measured using a spectrophotometer U-4100 manufactured by Hitachi High-Technologies Corporation. The results are shown in Table 1.

TABLE 1

| | Axis angle | Transmitted light intensity | CR |
|---|---|---|---|
| Comparative Example 1 | 60 | 59.04759 | 1.693549 |
| Comparative Example 2 | 67.5 | 77.96201 | 1.282676 |
| Comparative Example 3 | 82.5 | 19.6158 | 5.097931 |
| Example 1 | 90 | 0.0413607 | 2417.754 |
| Comparative Example 4 | 97.5 | 20.27872 | 4.931278 |
| Comparative Example 5 | 112.5 | 78.09852 | 1.280434 |
| Comparative Example 6 | 120 | 56.95775 | 1.755687 |

As is evident from the results in Table 1, a comparison between Example 1 with the angle between the absorption axes is 90° and each comparative example where the angle between the absorption axes deviates from 90° shows that even a slight angular deviation from 90° causes significant light leakage (transmitted light intensity) and a significant reduction in contrast ratio (CR).

Figure 4:
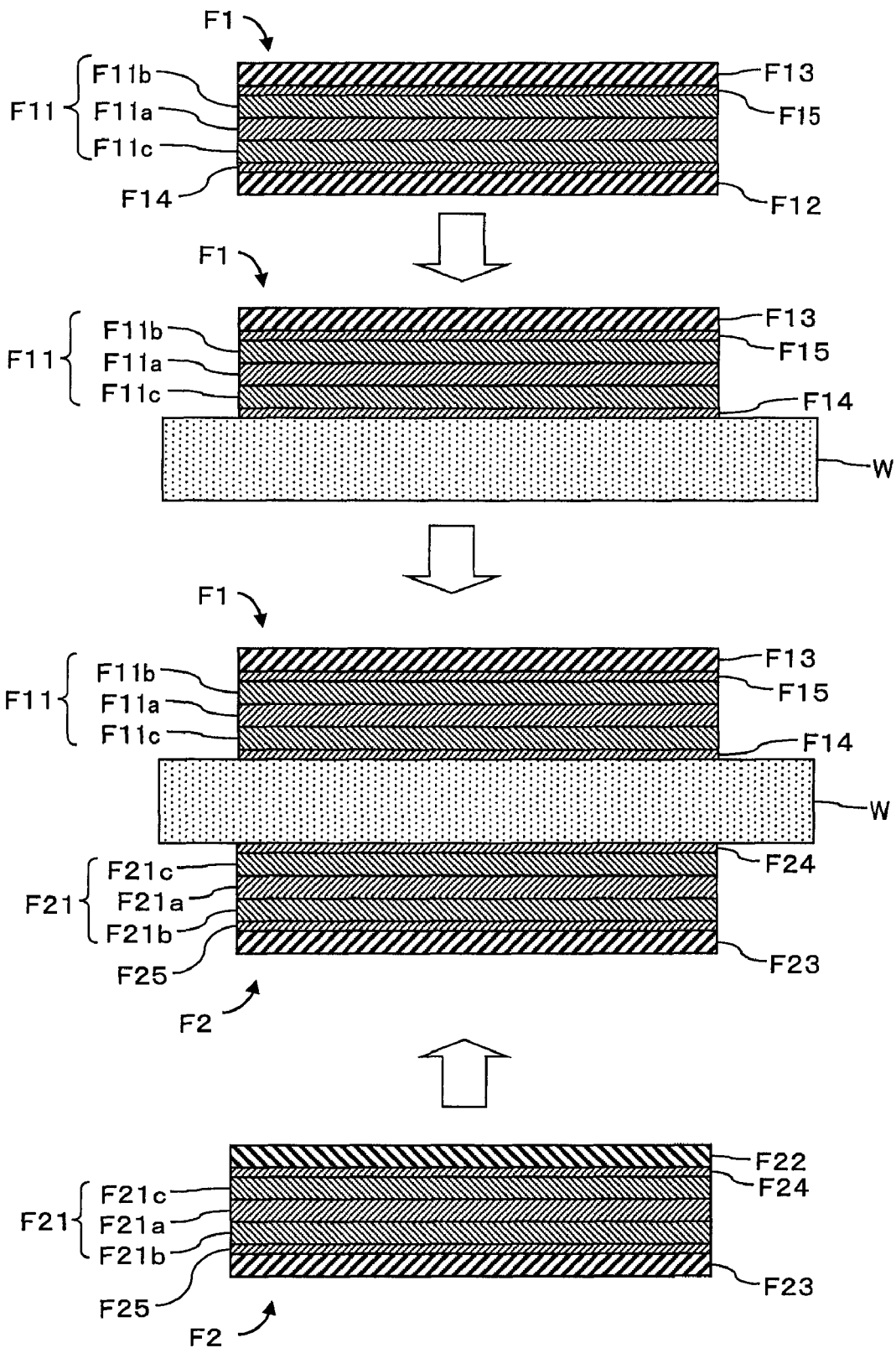
FIG. 4 is a diagram for illustrating an example of the laminated structure of each of first and second optical films.

As shown in FIG. 4, for example, the laminated structure of the first sheet material F1 includes a first optical film F11, a first release film F12, and a surface protecting film F13. The first optical film F11 includes a first polarizer F11a, a first film F11b provided on one side thereof with an adhesive layer (not shown) interposed therebetween, and a second film F11c provided on the other side thereof with an adhesive layer (not shown) interposed therebetween.

For example, the first and second films F11b and F11c are polarizer protecting films (such as triacetylcellulose films or PET films). The second film F11c is to be bonded to the surface of the optical display unit with a first pressure-sensitive adhesive layer F14 interposed therebetween. The first film F11b may undergo a surface treatment. Examples of the surface treatment include a hard coating treatment, an antireflection treatment, and a treatment for any other purpose such as anti-sticking, diffusion or antiglare purpose. The first release film F12 is provided on the second film F11c with a first pressure-sensitive adhesive layer F14 interposed therebetween. The surface protecting film F13 is provided on the first film F11b with a pressure-sensitive adhesive layer F15 interposed therebetween. The specific structure of the first and second films F11b and F11c is described below. Hereinafter, a laminated structure of a polarizer and a polarizer protecting film is also referred to as a polarizing plate.

In a factory, each step described below is performed in an isolated structure preferably with cleanliness maintained. In particular, cleanliness is preferably maintained in the step of bonding the optical film to the optical display unit.

In an embodiment of the invention, the first sheet material F1 has score lines that are previously formed so that the first optical film F11 can be divided by the score lines into pieces each having a length corresponding to the long side of the optical display unit. Each score line, which extends in the width direction of the first sheet material F1, is typically formed by cutting the layers other than the first release film F12 in the first sheet material F1. However, the layers other than the first release film F12 in the first sheet material F1 do not always have to be completely cut, and for example, at least one layer such as the first pressure-sensitive adhesive layer F14 may also be not completely cut, or the score line may be in any other form such as a perforation, as long as the first optical film F11 can be divided by each score line.

Figure 5:
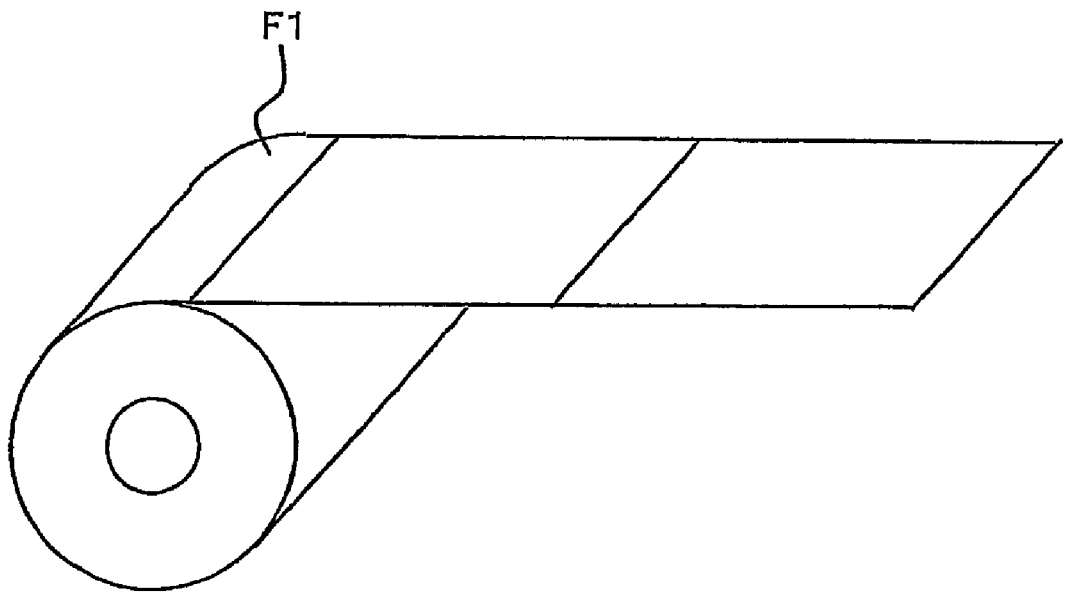
FIG. 5 is a perspective view of a first roll showing an example of the score lines formed in a first sheet material.

FIG. 5 is a perspective view of the first roll showing an example of the formation of score lines in the first sheet material F1. In this example, score lines are formed in the first sheet material at regular intervals corresponding to the long side of the optical display unit. Therefore, the first optical film F11 is divided by each score line so that a divided piece of the first optical film F11 with a size corresponding to that of the optical display unit can be obtained and bonded to the optical display unit.

Figure 6:
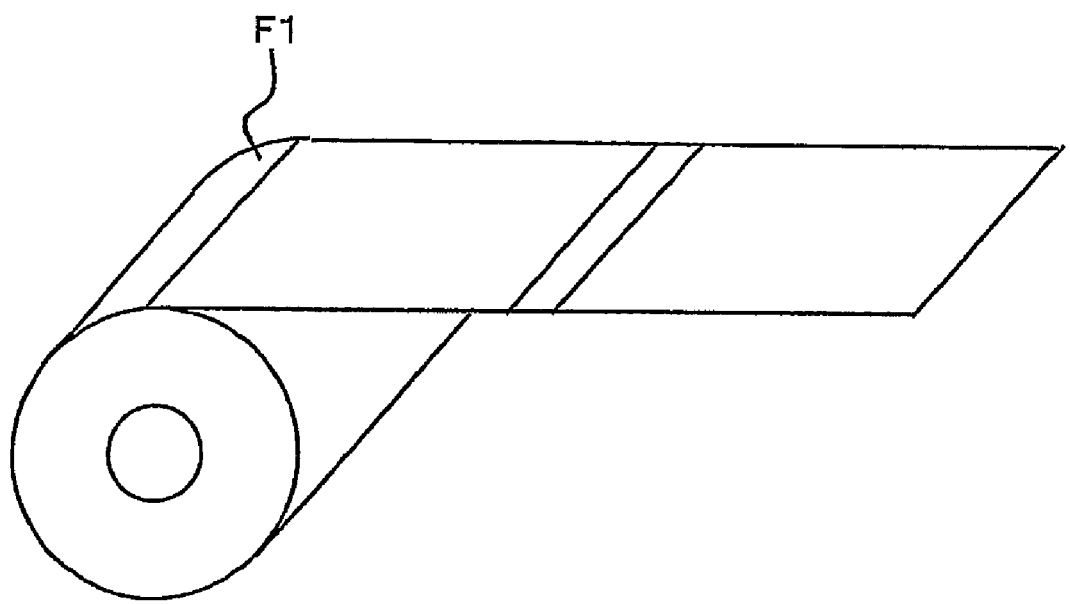
FIG. 6 is a perspective view of a first roll showing another example of the score lines formed in a first sheet material.

FIG. 6 is a perspective view of the first roll showing another example of the formation of score lines in the first sheet material F1. In this example, the first sheet material F1 has a portion with score lines formed at an interval corresponding to the long side of the optical display unit and a portion with score lines formed at an interval different from the interval corresponding to the long side of the optical display unit. When the first optical film F11 is divided by the score lines, the portion with the score lines formed at an interval corresponding to the long side of the optical display unit forms a divided piece of the first optical film F11 with a size corresponding to that of the optical display unit, which can be bonded to the optical display unit.

On the other hand, the portion with score lines formed at an interval different from the interval corresponding to the long side of the optical display unit may be removed without being bonded to the optical display unit. For example, a method may be used which includes performing inspection on the first sheet material F1 to detect any defect in advance and forming score lines while avoiding the defect so that the region to be bonded to the optical display unit does not include the defect (this method is called "skip cutting"). In this case, a divided piece containing the defect (the portion with score lines formed at an interval different from the interval corresponding to the long side of the optical display unit) is removed by means of a first rejection apparatus 19 as described below without being bonded to the optical display unit, so that the optical film yield is improved. In an embodiment of the invention, therefore, the step of feeding the optical film preferably includes a defective portion-removing step that includes removing a defect-containing, divided piece of the optical film.

The defect inspection method may be a method of performing imaging and image processing on both sides of the first sheet material F1 with transmitted light or reflected light, a method of performing imaging and image processing with a polarizing film for inspection arranged in a crossed Nicols relationship (also referred to as "0° cross") with the polarization axis of the polarizing plate (the object to be inspected) between a CCD camera and the object, or a method of performing imaging and image processing with a polarizing film for inspection arranged at a certain angle (for example, in the range of more than 0° to 10°, also referred to as "x° cross") with the polarization axis of the polarizing plate (the object to be inspected) between a CCD camera and the object. Known methods may be used for the image processing algorithm. For example, defects may be detected by grayscale determination based on binarization.

The method of performing imaging and image processing with transmitted light allows the detection of contaminants in the first sheet material F1. The method of performing imaging and image processing with reflected light allows the detection of contaminants deposited on the surface of the first sheet material F1. In the method of performing imaging and image processing with 0° cross, surface contaminants, dirt, and interior contaminants can generally be detected as bright spots. In the method of performing imaging and image processing with X° cross, knicks can generally be detected.

Score lines are formed in the first sheet material F1 by cutting the surface protecting film F13, the pressure-sensitive adhesive layer F15, the first optical film F11, and the first pressure-sensitive adhesive layer F14 without cutting the first release film F12. As a result, the first release film F12 can be used as a carrying medium for the first optical film F11. In an embodiment of the invention, therefore, the first release film F12 formed on the first optical film F11 with the first pressure-sensitive adhesive layer F14 interposed therebetween is preferably used as a carrying medium to feed the first and second optical films F11 and F21 to the first and second bonding steps, respectively. Any type of cutting means may be used to cut part of the first sheet material F1, exclusive of the first release film F12. Preferably, the cutting means is horizontally moved in the width direction of the first sheet material F1 when part of the first sheet material F1, exclusive of the first release film F12 is cut. The cutting means is preferably, but not limited to, a laser or an edge tool (such as a circular knife). According to such a method, the cut end surface of the portion obtained by cutting part of the first sheet material F1, exclusive of the first release film F12, is made smoother than that obtained by a conventional method of cutting the material with an edge tool pressed against the material (with the cutting means vertically moved), so that the end surface do not have to be further processed.

(2) Feeding Step (S2 in FIG. 1). The first sheet material F1 is fed to the downstream side from the first roll provided and placed. For example, a first feeder 12 to feed the first sheet material F1 includes a pair of nip rollers, a tension roller, a rotary drive, an accumulator, a sensor, a controller, and any other unit.

(3) First Optical Film Bonding Step (S3 in FIG. 1). While the first release film F12 is removed using a first peeling apparatus 17, the first optical film F11 separated from the first release film F12 is bonded to an optical display unit W with the first pressure-sensitive adhesive layer F14 interposed therebetween using a first bonding apparatus 18. In this step, the first optical film F11 is divided into a piece by each score line, and the resulting divided piece of the first optical film F11 with a size corresponding to that of the optical display unit W is bonded to the optical display unit W. In the bonding step, the first optical film F11 and the optical display unit W may be press-bonded between a pair of rolls as described below.

(4-1) Cleaning Step (S4-1 in FIG. 1). The surface of the optical display unit W is cleaned by polishing cleaning, water cleaning or any other cleaning techniques. The cleaned optical display unit W is transported to an inspection apparatus.

(4-2) Inspecting Step (S4-2 in FIG. 1). After the cleaning, the surface of the optical display unit W is inspected using an inspection apparatus. After the inspection, the optical display unit W is transported to the first bonding apparatus 18.

All of the step of providing the first roll, the feeding step, the step of bonding the first optical film, the cleaning step, and the inspection step are preferably performed in a continuous manufacturing line. In the above series of manufacturing steps, the first optical film F11 is bonded to one side of the optical display unit W. A description is given below of the manufacturing step in which the second optical film F21 is bonded to the other side.

(5) Step of Providing Second Material Roll (S11 in FIG. 1). A second roll of a second belt-shaped sheet material F2 is provided. As shown in FIG. 4, the laminated structure of the second sheet material F2 is typically, but not limited to, the same as that of the first sheet material. The second sheet material F2 includes a second optical film F21, a second release film F22, and a surface protecting film F23. The second optical film F21 includes a second polarizer 21a, a third film F21b provided on one side of the polarizer 21a with an adhesive layer (not shown) interposed therebetween, and a fourth film F21c provided on the other side with an adhesive layer (not shown) interposed therebetween.

For example, the third and fourth films F21b and F21c are each a polarizer protecting film (such as a triacetylcellulose film or a PET film). The fourth film F21c is to be bonded to the surface of the optical display unit W with a second pressure-sensitive adhesive layer F24 interposed therebetween. The third film F21b may undergo a surface treatment. Examples of the surface treatment include a hard coating treatment, an antireflection treatment, and a treatment for any other purpose such as anti-sticking, diffusion or antiglare purpose. The second release film F22 is provided on the fourth film F21c with a second pressure-sensitive adhesive layer F24 interposed therebetween. The surface protecting film F23 is provided on the third film F21b with a pressure-sensitive adhesive layer F25 interposed therebetween.

In an embodiment of the invention, the second sheet material F2 has score lines that are previously formed so that the second optical film F21 can be divided by the score lines into pieces each having a length corresponding to the short side of the optical display unit. Each score line, which extends in the width direction of the second sheet material F2, is typically formed by cutting the layers other than the second release film F22 in the second sheet material F2. However, the layers other than the second release film F22 in the second sheet material F2 do not always have to be completely cut, and for example, at least one layer such as the second pressure-sensitive adhesive layer F24 may also be not completely cut, or the score line may be in any other form such as a perforation, as long as the second optical film F21 can be divided by each score line.

The score lines may be formed in the second sheet material F2 in the same manner as described for the first sheet material F1 using FIGS. 5 and 6. The cutting means for use in forming the score lines in the second sheet material F2 may be the same as that described above for use in forming the score lines in the first sheet material F1.

(6) Feeding Step (S12 in FIG. 1). The second sheet material F2 is fed to the downstream side from the second roll provided and placed. For example, a second feeder 22 to feed the second sheet material F2 includes a pair of nip rollers, a tension roller, a rotary drive, an accumulator, a sensor, a controller, and any other unit.

(7) Second Optical Film Bonding Step (S13 in FIG. 1). Subsequently, while the second release film F22 is removed using a second peeling apparatus 27, the second optical film F21 separated from the second release film F22 is bonded to the opposite side of the optical display unit W (from the side where the first optical film F11 is bonded) with the second pressure-sensitive adhesive layer F24 interposed therebetween using a second bonding apparatus 28. In this step, the second optical film F21 is divided into a piece by each score line, and the resulting divided piece of the second optical film F21 with a size corresponding to that of the optical display unit W is bonded to the optical display unit W. Before the second optical film F21 is bonded to the optical display unit W, the optical display unit W may be turned by 90° using the feed direction-switching mechanism of the feeding mechanism so that the first and second optical films F11 and F21 can have a crossed Nicols relationship.

(8) Transporting and Feeding Step (S5 in FIG. 1). Preferably, the manufacturing method of the invention further includes a transporting and feeding step between the first optical film bonding step and the second optical film bonding step, and the transporting and feeding step includes the step of turning the optical display unit from the direction of bonding in one of the first and second bonding apparatuses to the direction of bonding in the other bonding apparatus. In addition to the turning step, the transporting and feeding step may further include the step of turning over the optical display unit. In an embodiment of the invention, the transporting and feeding step preferably includes the step of turning the optical display unit W, which has undergone the first bonding step, to the direction of bonding in the second bonding step. In a preferred embodiment of the invention, the turning step is performed so that the direction of the long side of the first optical film F11 bonded to the optical display unit W can make an angle of 0±5°, preferably 0±1°, with the direction of the long side of the second optical film F21 to be bonded. For example, when the direction of the first optical film F11-feeding line is parallel to the direction of the second optical film F21-feeding line (including when they are on a straight line), the turning angle in the turning step is preferably from 85° to 95°. In the bonding step, the second optical film F21 and the optical display unit W may be press-bonded between a pair of rolls as described below.

(9) Step of Inspecting Optical Display Device (S14 in FIG. 1). An inspection apparatus is used to inspect an optical display device including the optical display unit W and the optical films bonded to both sides of the optical display unit W. An example of the inspection method is a method of performing imaging and image processing with reflected light on both sides of the optical display device. Another example of the method uses a polarizing film for inspection placed between a CCD camera and the object to be inspected. Known methods may be used for the image processing algorithm. For example, defects may be detected by grayscale determination based on binarization.

(10) Defect information obtained by the inspection apparatus is used to determine whether the optical display device is non-defective. The optical display device determined to be non-defective is transferred to the next implementing process. When determined to be defective, it is subjected to a reworking process, in which a new optical film is bonded, and then the product is inspected. The product determined to be non-defective is transferred to the implementing process, but the product determined to be defective is subjected to the reworking process again or to disposal.

In the above series of manufacturing steps, the first optical film F11 bonding step and the second optical film F21 bonding step may be performed in a continuous manufacturing line, which makes it possible to manufacture the optical display device in a satisfactory manner.

Configuration of the Whole of Manufacturing System

Next, a description is given of the configuration of the whole of the manufacturing system of the invention. The manufacturing system of the invention is a system for manufacturing an optical display device including an optical display unit and an optically-anisotropic optical film bonded thereto, preferably a system for manufacturing an optical display device including an optical display unit and an optical film that includes a polarizing plate and is bonded to the optical display unit. The manufacturing system of the invention includes a first boding apparatus for performing the first bonding step and a second bonding apparatus for performing the second bonding step.

FIG. 3 shows an exemplary system according to an embodiment of the invention including an optical display unit W feeding apparatus M1, a first optical film F11 feeding apparatus M2, a first bonding apparatus M3 for bonding the first optical film F11, a transporting and feeding apparatus M4 for transporting and feeding the optical display unit W after the bonding, a second optical film F21 feeding apparatus M5, and a second bonding apparatus M6 for bonding the second optical film F21.

Concerning this embodiment, FIG. 3 shows an example where the first optical film F11 feeding apparatus M2, the first bonding apparatus M3, the transporting and feeding apparatus M4, the second optical film F21 feeding apparatus M5, and the second bonding apparatus M6 are linearly arranged, and the feeding apparatus M1 is placed so that the optical display unit W can be fed in a direction perpendicular to the direction of the flow of the optical display unit W in the first bonding apparatus M3.

Configuration of Each Section in the Manufacturing System

An example of the configuration of each section in the manufacturing system of the invention is described below.

The manufacturing system of the invention includes the optical display unit W feeding apparatus M1 for feeding the optical display unit W.

The manufacturing system of the invention includes the first optical film feeding apparatus M2 for drawing and feeding the first sheet material F1 from a roll of the first sheet material F1 including the first optical film F11. This embodiment shows an example where the first optical film feeding apparatus M2 includes a first feeder 12.

The first roll of the first sheet material F1 is mounted on a roll mount apparatus that is geared to a motor or the like to rotate freely or at a certain speed. A controller 1 is provided to set the rotational speed and to control the drive.

The first feeder 12 is a feeding mechanism to feed the first sheet material F1 to the downstream side. The first feeder 12 is controlled by the controller 1.

The manufacturing system of the invention includes the first bonding apparatus 18 (M3) for bonding the first optical film F11, which is fed from the first optical film feeding apparatus M2, to one surface of the optical display unit W, which is fed from the optical display unit W feeding apparatus M1. This embodiment shows an example where the first bonding apparatus 18 (M3) includes a press roller, a guide roller, a first peeling apparatus 17, and a first removing apparatus 19. The first removing apparatus 19 forms a defective portion removing mechanism to remove a defective divided piece of the optical film, but such a removing mechanism may be omitted.

The first bonding apparatus 18 bonds part of the first sheet material F1 (the first optical film F11), from which the release film F12 has been peeled off by the first peeling apparatus 17, to the optical display unit W with the first pressure-sensitive adhesive layer F14 interposed therebetween. The first sheet material F1 feeding route is placed above the optical display unit W feeding route.

In the bonding process, the first optical film F11 is bonded to the surface of the optical display unit W, while it is pressed against the surface by the press roller and the guide roller. The pressure from the press roller and the guide roller and the driving operation thereof are controlled by the controller 1.

The first peeling apparatus 17 has a peeling mechanism that is configured so that the first release film F12 can be peeled off by reversing the feeding direction of the first release film F12 and that part of the first sheet material F1 (the first optical film F11) peeled off from the first release film F12 can be fed to the surface of the optical display unit W. After peeled off, the release film F12 is wound around a roll. The winding around the roll is controlled by the controller 1.

Specifically, in an embodiment of the invention, the first optical film feeding apparatus M2 has a feeding mechanism that feeds the first optical film F11 to the first bonding apparatus M3 by using, as a carrying medium, the first release film F12, which is provided on the first optical film F11 with the pressure-sensitive adhesive layer F14 interposed therebetween.

The bonding mechanism includes a press roller and a guide roller opposed thereto, which are provided at the bonding position. The guide roller comprises a rubber roller whose rotation is driven by a motor, and is provided movable upward and downward. The press roller, which is provided movable upward and downward immediately above the guide roller, comprises a metallic roller whose rotation is driven by a motor. When the optical display unit W is fed to the bonding position, the press roller is elevated to a position higher than the upper surface so that the space between the rollers is widened. Alternatively, the guide roller and the press roller may each be a rubber roller or a metallic roller. As described above, the system is configured so that the optical display unit W can be cleaned by any type of cleaning apparatus and fed by a feeding mechanism. The feeding mechanism is also controlled by the controller 1.

A description is given of the first removing apparatus 19 for removing a defective portion of the first sheet material F1. When the first sheet material F1 having a defect is transported to the bonding position, the guide roller moves vertically downward. Subsequently, a roller over which a remover film is looped moves to the regular position of the guide roller. The press roller is allowed to move vertically downward to press the defective portion of the first sheet material F1 against the remover film. The defective portion of the first sheet material F1 is attached to the remover film and wound around a roller together with the remover film. The remover film can adhere to the defective portion of the first sheet material F1 by using the adhesive power of the first pressure-sensitive adhesive layer F14 of the first sheet material F1. Alternatively, however, a pressure-sensitive adhesive tape may be used as the remover film.

The optical display unit W to which the first optical film F11 is bonded as described above is fed to the downstream side, where the second optical film F21 (the second sheet material F2) is bonded thereto. Hereinafter, the same apparatus configuration will be described briefly.

The manufacturing system of the invention preferably further includes a transporting and feeding apparatus M4 placed between the first and second bonding apparatuses. The transporting and feeding apparatus M4 is an apparatus for transporting and feeding the optical display unit from one of the first and second bonding apparatuses to the other. The feeder preferably has a turning mechanism 20 that turns the optical display unit W from the direction of bonding in one of the first and second bonding apparatuses to the direction of bonding in the other bonding apparatus. Besides the turning mechanism 20, the feeder may further include a turning-over mechanism for turning over the optical display unit.

For example, when the second optical film F21 is bonded in a 90° relationship (crossed Nicols relationship) with the first optical film F11, the optical display unit W is turned by 90° by the feeding direction-switching mechanism (turning mechanism 20) of the feeding mechanism, and then the second optical film F21 is bonded thereto. The method described below for bonding the second sheet material F2 includes performing each step, while keeping the second sheet material F2 turned upside down (with the second release film F22 facing upward), and bonding the second optical film F21 to the lower side of the optical display unit W.

The manufacturing system of the invention includes the second optical film feeding apparatus M5 for drawing and feeding the second sheet material F2 from a roll of the second sheet material F2 including the second optical film F21. This embodiment shows an example where the second optical film feeding apparatus M5 includes a second feeder 22.

The second roll of the second sheet material F2 is mounted on a roll mount apparatus that is geared to a motor or the like to rotate freely or at a certain speed. The controller 1 is provided to set the rotational speed and to control the drive.

The second feeder 22 is a feeding mechanism to feed the second sheet material F2 to the downstream side. The second feeder 22 is controlled by the controller 1.

The manufacturing system of the invention includes the second bonding apparatus 28 (M6) for bonding the second optical film F21, which is fed from the second optical film feeding apparatus M5, to the other surface of the optical display unit W, which is fed from the transporting and feeding apparatus M4. This embodiment shows an example where the second bonding apparatus 28 (M6) further includes a press roller, a guide roller, a second peeling apparatus 27, and a second removing apparatus 29. The second removing apparatus 29 forms a defective portion removing mechanism to remove a defective divided piece of the optical film, but such a removing mechanism may be omitted.

The second bonding apparatus 28 bonds part of the second sheet material F2 (the second optical film F21), from which the second release film F22 has been peeled off by the second peeling apparatus 27, to the optical display unit W with the second pressure-sensitive adhesive layer F24 interposed therebetween. In the bonding process, the second optical film F21 is bonded to the surface of the optical display unit W, while it is pressed against the surface by the press roller and the guide roller. The pressure from the press roller and the guide roller and the driving operation thereof are controlled by the controller 1.

The second peeling apparatus 27 has a peeling mechanism that is configured so that the second release film F22 can be peeled off by reversing the feeding direction of the second release film F22 and that part of the second sheet material F2 (the second optical film) peeled off from the second release film F22 can be fed to the surface of the optical display unit W. After peeled off, the release film F22 is wound around a roll. The winding around the roll is controlled by the controller 1.

Specifically, in an embodiment of the invention, the second optical film feeding apparatus M5 has a feeding mechanism that feeds the second optical film F21 to the second bonding apparatus M6 by using, as a carrying medium, the second release film F22, which is provided on the second optical film F21 with the second pressure-sensitive adhesive layer F24 interposed therebetween.

The bonding mechanism includes a press roller and a guide roller opposed thereto, which are provided at the bonding position. The guide roller comprises a rubber roller whose rotation is driven by a motor, and is provided movable upward and downward. The press roller, which is provided movable upward and downward immediately under the guide roller, comprises a metallic roller whose rotation is driven by a motor. When the optical display unit W is fed to the bonding position, the press roller is shifted to a lower position so that the space between the rollers is widened. Alternatively, the guide roller and the press roller may each be a rubber roller or a metallic roller.

A description is given of the second removing apparatus 29 for removing a defective portion of the second sheet material F2. When the second sheet material F2 having a defect is transported to the bonding position, the guide roller moves vertically upward. Subsequently, a roller over which a remover film is looped moves to the regular position of the guide roller. The press roller is allowed to move vertically upward to press the defective portion of the second sheet material F2 against the remover film. The defective portion of the second sheet material F2 is attached to the remover film and wound around a roller together with the remover film.

The optical display device formed by bonding the first and second sheet materials to the optical display unit W is fed to an inspection apparatus. The inspection apparatus inspects both sides of the optical display device transported thereto. A light source and a half mirror are used to vertically illuminate the upper surface of the optical display device, and the reflected light is captured as image data by a CCD camera. Another light source is used to illuminate, at a predetermined angle, the surface of the optical display device, and the reflected light is also captured as image data by the CCD camera. The opposite surface of the optical display device may also be inspected using a light source and a CCD camera. These image data are subjected to image analysis to determine whether the product is non-defective.

For example, the timing of the operation of each apparatus is calculated by a detecting method using sensors placed at specific locations or by a method of detecting the rotating part of the feeder or the feeding mechanism with a rotary encoder or the like. The controller 1 may be implemented in cooperation with software programs and hardware resources such as CPU and memories. In this case, program software, procedures, various settings, etc. are previously stored in memories. Private circuits, firmware, or the like may also be used for the implementation.

The optical display device obtained by the manufacturing method of the invention includes the optical display units and the optical films bonded to both sides of the optical display unit. The optical display device can be used as an image display such as a liquid crystal display, an organic electroluminescence (EL) display, or a plasma display panel (PDP).

The liquid crystal display may be formed according to conventional techniques. Specifically, the liquid crystal display is usually formed by assembling a liquid crystal cell (corresponding to the optical display unit) and optical films, and optional components such as a lighting system and incorporating a driving circuit, according to any conventional techniques, except that the optical films are used according to the invention. The liquid crystal cell to be used may also be of any type such as TN (Twisted Nematic) type, STN (Super Twisted Nematic) type, or n type. In particular, a VA (Vertical Alignment) or IPS (In-Plane-Switching) mode liquid crystal cell is effectively used in an embodiment of the invention.

Any appropriate liquid crystal display may be formed such as a liquid crystal display including a liquid crystal cell and the optical film placed on one or both sides of the liquid crystal cell or a liquid crystal display using a backlight or a reflector in the lighting system. In that case, the optical film or films may be placed on one or both sides of the liquid crystal cell. The optical films placed on both sides may be the same or different. In the process of forming the liquid crystal display, one or more layers of an additional appropriate component or components such as a diffusion plate, an antiglare layer, an anti-reflection film, a protective plate, a prism array, a lens array sheet, a light diffusion plate, and a backlight may also be placed at an appropriate location or locations.

The optical film or films may be placed on one or both sides of a liquid crystal cell to form a liquid crystal display having an appropriate structure according to conventional techniques, such as a transmissive, reflective or transflective liquid crystal display. Therefore, the liquid crystal cell used to form a liquid crystal display may be of any type. Any appropriate type of liquid crystal cell such as an active matrix driving type typified by a thin film transistor type may be used.

The polarizing plates or the optical components provided on both sides of a liquid crystal cell may be the same or different. In the process of forming a liquid crystal display, one or more layers of an additional appropriate component or components such as a prism array sheet, a lens array sheet, a light diffusion plate, and a backlight may be placed at an appropriate location or locations.

Bonding Methods Performed Using Turn According to Other Embodiments

The embodiment described above shows a case where one of the first and second optical films F11 and F21 is bonded to the optical display unit W from the upper side, and the other is bonded to the optical display unit W from the lower side. Alternatively, the system may be configured so that both the first and second optical films F11 and F21 can be bonded to the optical display unit W from one of the upper and lower sides. In this case, the process may include bonding the first optical film F11 to one surface of the optical display unit W from the upper or lower side, then turning the optical display unit W so that it can be turned over and rotated, and bonding the first optical film F11 to the other surface. For example, the turning may be performed in such a manner that the optical film is turned over and rotated by 90°, which makes it possible to bond the first and second optical films F11 and F21 in a crossed Nicols relationship with each other.

Figure 7:
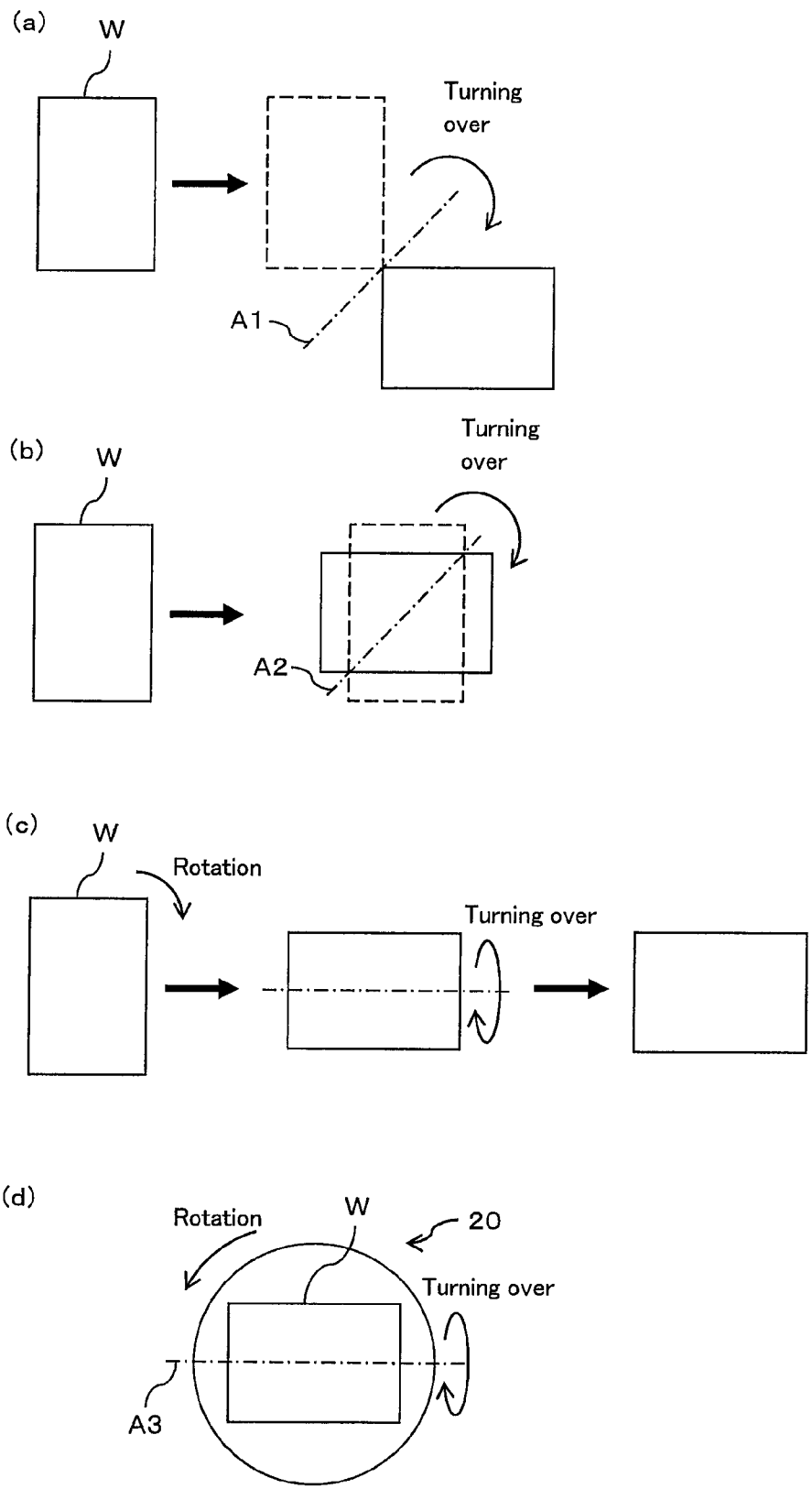
FIG. 7 is a schematic diagram showing a specific example of the method of turning the optical display unit over and by 90°.
Figure 8:
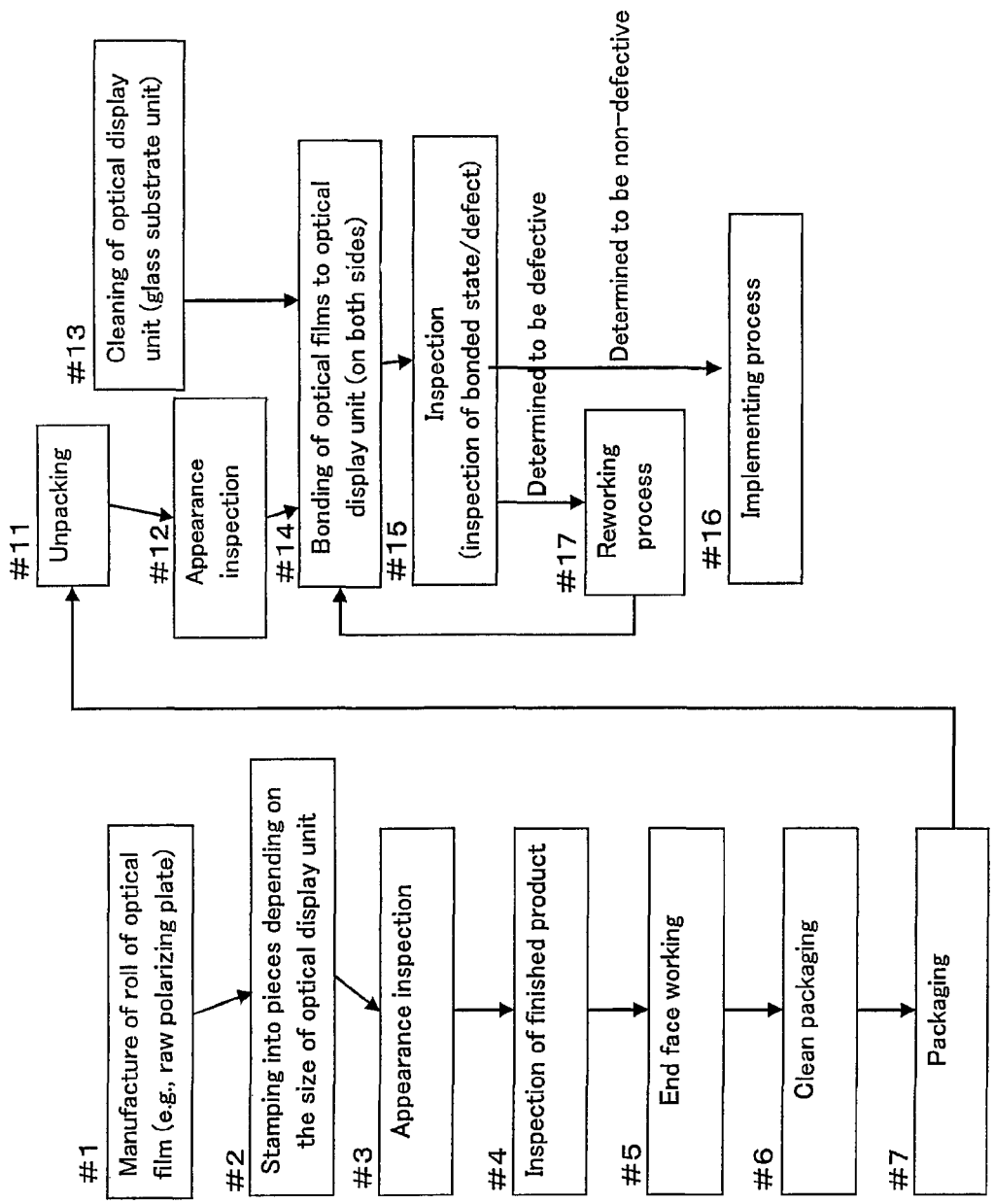
FIG. 8 is a flow chart of a conventional optical display device manufacturing method.

FIG. 7 is a schematic diagram showing examples of the method of turning the optical display unit W in such a manner that it is turned over and rotated by 90°. Parts (a) and (b) of FIG. 7 show methods in which the optical display unit W is turned over so as to have a 90° relationship. Part (a) shows an example where the optical display unit W is turned over around a horizontal rotation axis A1 passing through a corner of the optical display unit W, and part (b) shows an example where the optical display unit W is turned over around a horizontal rotation axis A2 passing through the center of the optical display unit W. Part (c) of FIG. 7 shows a method in which turning over and rotation are performed in two stages so that a 90° relationship can be achieved, wherein the turning over and the rotation may be performed in any order. Part (d) of FIG. 7 shows a method in which rotation is performed to achieve a 90° relationship, while turning over is performed, using a turning mechanism 20 including a mechanism for rotating the optical display unit W in a horizontal plane and a mechanism for turning over the optical display unit W around a horizontal rotation axis A3.

The terms "rotated by 90°" and "a 90° relationship" mean a state or relationship where the long side of the optical display unit W after the turning is parallel to the short side before the turning and the short side of the optical display unit W after the turning is parallel to the long side before the turning. It will be understood that the method of turning the optical display unit W is not limited to the modes shown in FIG. 7 and the optical display unit W may be turned over and rotated by 90° in any other mode.

In the embodiment described above, after bonded in the first bonding apparatus 18, the optical display unit W is turned to the bonding direction in the second bonding apparatus 28. Alternatively, as stated above, the second optical film F21 may be bonded to the optical display unit W prior to the first optical film F11. In this case, the optical display unit W after the bonding in the second bonding apparatus 28 may be turned to the bonding direction in the first bonding apparatus 18.

Manufacturing Systems According to Other Embodiments

In the manufacturing system of the invention, the respective apparatuses may be arranged in any order. For example, the optical display unit W feeding apparatus M1, the first optical film F11 feeding apparatus M2, and the first bonding apparatus M3 may be linearly arranged, and the second optical film F21 feeding apparatus M5 and the second bonding apparatus M6 may be arranged parallel to the linearly arranged apparatuses. The transporting and feeding apparatus M4 may be placed between the first and second bonding apparatuses M3 and M6.

In an embodiment of the invention, when no mechanism is provided for turning the optical display unit W, the first optical film F11 feeding apparatus M2 and the first bonding apparatus M3 are preferably arranged perpendicular to the second optical film F21 feeding apparatus M5 and the second bonding apparatus M6.

Descripton of Reference Characters

In the drawings, reference character F1 represents a first sheet material, F2 a second sheet material, F11a first optical film, F11a a first polarizer, F11b a first film, F11c a second film, F12 a first release film, F13 a surface protecting film, F14 a first pressure-sensitive adhesive layer, F21a second optical film, F21a a second polarizer, F21b a third film, F21c a fourth film, F22 a second release film, F23 a surface protecting film, F24 a second pressure-sensitive adhesive layer, M1 an optical display unit feeding apparatus, M2 a first optical film feeding apparatus, M3 a first bonding apparatus, M4 a transporting and feeding apparatus, M5 a second optical film feeding apparatus, M6 a second bonding apparatus, 1a controller, 12 a first feeder, 17 a first peeling apparatus, 18 a first bonding apparatus, 19 a first removing apparatus, 20 a turning mechanism, 22 a second feeder, 27 a second peeling apparatus, 28 a second bonding apparatus, 29 a second removing apparatus, and W an optical display unit.

The invention claimed is:

1. A method for manufacturing an optical display device comprising a rectangular optical display unit and an optically-anisotropic optical film bonded to the optical display unit, comprising:

a first bonding step comprising: providing a roll of a belt-shaped sheet material that comprises a first optical film and a first release film with a width corresponding to a short side of the optical display unit and has score lines that are previously formed by cutting layers of the belt-shaped sheet material other than the first release film so that the first optical film can be divided by the score lines into pieces each having a length corresponding to a long side of the optical display unit; and bonding a divided piece of the first optical film having a length corresponding to the long side of the optical display unit to one surface of the optical display unit; and a second bonding step comprising: providing a roll of a belt-shaped sheet material that comprises a second optical film and a second release film with a width corresponding to the long side of the optical display unit and has score lines that are previously formed by cutting layers of the belt-shaped sheet material other than the second release film so that the second optical film can be divided by the score lines into pieces each having a length corresponding to the short side of the optical display unit; and bonding a divided piece of the second optical film having a length corresponding to the short side of the optical display unit to another surface of the optical display unit, wherein the first optical film comprises a first polarizing plate whose longitudinal direction is parallel to its absorption axis, and the second optical film comprises a second polarizing plate whose longitudinal direction is parallel to its absorption axis.

2. The method according to claim 1, further comprising a turning step comprising turning the optical display unit to a bonding direction for the second bonding step after the first bonding step.

3. The method according to claim 1 or 2, further comprising a defective portion removing step comprising removing a defective divided piece of the optical film when the first and second optical films are each fed.

4. The method according to claim 1 or 2, wherein the first and second optical films are transported and fed to the first and second bonding steps, respectively, with the first and second release films, each of which is provided on the optical film with a pressure-sensitive adhesive layer interposed therebetween.

5. A method for manufacturing an optical display device comprising an optical film including a polarizing plate and a rectangular optical display unit having a surface to which the optical film is bonded, comprising the steps of:

providing a material roll that is a roll of a belt-shaped sheet material obtained by slitting a material having undergone no slitting process into a width corresponding to a short or long side of the optical display unit, wherein the material comprises the optical film, a pressure-sensitive adhesive layer, and a release film laminated in this order and has score lines that are previously formed by cutting layers of the belt-shaped sheet material other than the release film so that the optical film can be divided by the score lines into pieces each having a length corresponding to the long or short side of the optical display unit, the optical film comprises a polarizing plate whose longitudinal direction is parallel to its absorption axis, and the slitting is performed parallel to the longitudinal direction of the material;

drawing the belt-shaped sheet material from the material roll; and bonding a divided piece of the optical film to a surface of the rectangular optical display unit.

* * * * *